US010497002B2

(12) United States Patent
Huyi et al.

(10) Patent No.: US 10,497,002 B2
(45) Date of Patent: *Dec. 3, 2019

(54) COMPUTING DEVICES AND METHODS FOR IDENTIFYING GEOGRAPHIC AREAS THAT SATISFY A SET OF MULTIPLE DIFFERENT CRITERIA

(71) Applicant: GOOGLE LLC, Mountain View, CA (US)

(72) Inventors: Charles Huyi, Palo Alto, CA (US); Mengke Li, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,854

(22) Filed: Mar. 11, 2019

(65) Prior Publication Data

US 2019/0205890 A1    Jul. 4, 2019

(51) Int. Cl.
G06Q 30/00 (2012.01)
G06Q 10/10 (2012.01)

(52) U.S. Cl.
CPC .............. G06Q 30/00 (2013.01); G06Q 10/10 (2013.01)

(58) Field of Classification Search
CPC ......... H04W 4/02; G06Q 10/00; G06Q 30/06; G01C 21/3476; G06F 17/3087; G06F 3/0488
See application file for complete search history.

(56) References Cited

U.S. PATENT DOCUMENTS

| 6,173,067 | B1 | 1/2001 | Payton et al. |
| 7,188,317 | B1 | 3/2007 | Hazel |
| 7,353,114 | B1 | 4/2008 | Rohlf et al. |
| 7,376,516 | B2 | 5/2008 | Jones |
| 7,395,140 | B2 | 7/2008 | Christie et al. |
| 7,529,639 | B2 | 5/2009 | Rasanen et al. |
| 7,657,504 | B2 | 2/2010 | Jing et al. |
| 7,707,208 | B2 | 4/2010 | Jing et al. |
| 7,725,460 | B2 | 5/2010 | Seitz et al. |
| 7,945,852 | B1 | 5/2011 | Pilskalns |
| 8,015,183 | B2 | 9/2011 | Frank |
| 8,489,641 | B1 | 7/2013 | Seefeld et al. |
| 9,009,198 | B2 | 4/2015 | Seefeld et al. |
| 2002/0078035 | A1 | 6/2002 | Frank et al. |
| 2003/0036848 | A1 | 2/2003 | Sheha et al. |

(Continued)

OTHER PUBLICATIONS

Wikipedia. "Geographic Information System." [Retrieved on Jul. 7, 2010] Retrieved from the Internet <URL: <http://en.wjkjtredja.Org/w/index.DhpMtleKjeosraphic> information svst . . . > 20 pages.

(Continued)

Primary Examiner — Phi Hoang
(74) Attorney, Agent, or Firm — Marshall, Gerstein & Borun LLP

(57) ABSTRACT

The present disclosure relates to identifying geographic areas that satisfy a set of multiple different criteria. More specifically, the present disclosure relates to a user interface that allows a user, or a collaborating group of users to specify a set of multiple different criteria associated with various features of a geographic map. In response to a user, or a collaborating group of users entering a set of multiple different criteria, a geographic map is generated that includes identified areas that satisfy the multiple different criteria.

20 Claims, 5 Drawing Sheets

(56) References Cited

U.S. PATENT DOCUMENTS

| | | |
|---|---|---|
| 2003/0074358 A1 | 4/2003 | Sarbaz et al. |
| 2003/0229441 A1 | 12/2003 | Pechatnikov et al. |
| 2004/0030706 A1 | 2/2004 | Evans |
| 2004/0030741 A1 | 2/2004 | Wolton et al. |
| 2004/0225647 A1 | 11/2004 | Connelly et al. |
| 2004/0259573 A1 | 12/2004 | Cheng |
| 2005/0222989 A1 | 10/2005 | Haveliwala et al. |
| 2005/0278378 A1 | 12/2005 | Frank |
| 2006/0101005 A1 | 5/2006 | Yang et al. |
| 2006/0271277 A1 | 11/2006 | Hu et al. |
| 2007/0083557 A1 | 4/2007 | Leiserowitz et al. |
| 2007/0118520 A1 | 5/2007 | Bliss et al. |
| 2007/0130153 A1 | 6/2007 | Nachman et al. |
| 2007/0156654 A1 | 7/2007 | Ravinarayanan |
| 2007/0171716 A1 | 7/2007 | Wright et al. |
| 2008/0010605 A1 | 1/2008 | Frank |
| 2008/0045234 A1 | 2/2008 | Reed |
| 2008/0059889 A1 | 3/2008 | Parker et al. |
| 2008/0109757 A1 | 5/2008 | Stambaugh |
| 2008/0115082 A1 | 5/2008 | Simmons et al. |
| 2008/0140628 A1 | 6/2008 | Ubalde et al. |
| 2008/0154888 A1 | 6/2008 | Buron et al. |
| 2008/0163073 A1 | 7/2008 | Becker et al. |
| 2008/0244429 A1 | 10/2008 | Stading |
| 2008/0256444 A1 | 10/2008 | Wang et al. |
| 2008/0262717 A1 | 10/2008 | Ettinger |
| 2008/0298342 A1 | 12/2008 | Appleton et al. |
| 2008/0301643 A1 | 12/2008 | Appleton et al. |
| 2009/0055355 A1 | 2/2009 | Brunner et al. |
| 2009/0082037 A1 | 3/2009 | Ju et al. |
| 2009/0132316 A1 | 5/2009 | Florance et al. |
| 2009/0132469 A1 | 5/2009 | White et al. |
| 2009/0171939 A1 | 7/2009 | Athsani et al. |
| 2009/0189901 A1 | 7/2009 | Steinthal et al. |
| 2009/0210388 A1 | 8/2009 | Elson et al. |
| 2009/0282353 A1 | 11/2009 | Halbherr et al. |
| 2010/0015994 A1 | 1/2010 | McBride et al. |
| 2010/0057337 A1 | 3/2010 | Fuchs |
| 2010/0057562 A1 | 3/2010 | Gabbay |
| 2010/0063854 A1 | 3/2010 | Purvis et al. |
| 2010/0069035 A1 | 3/2010 | Johnson |
| 2010/0070166 A1 | 3/2010 | Krzanowski |
| 2010/0070448 A1 | 3/2010 | Omoigui |
| 2010/0131366 A1 | 5/2010 | Gibson et al. |
| 2010/0168994 A1 | 7/2010 | Bourque et al. |
| 2010/0168996 A1 | 7/2010 | Bourque et al. |
| 2010/0174709 A1 | 7/2010 | Hansen et al. |
| 2010/0185609 A1 | 7/2010 | Wright et al. |
| 2010/0298050 A1 | 11/2010 | Taraschuk et al. |
| 2011/0106441 A1 | 5/2011 | Robinson |
| 2011/0106534 A1 | 5/2011 | LeBeau et al. |
| 2011/0130956 A1 | 6/2011 | Tracton et al. |
| 2011/0161875 A1 | 6/2011 | Kankainen |
| 2012/0022781 A1 | 1/2012 | Wilson |
| 2012/0317108 A1 | 12/2012 | Okazaki et al. |
| 2013/0024107 A1 | 1/2013 | Xie et al. |
| 2013/0173569 A1 | 7/2013 | Pearcy |
| 2013/0179304 A1 | 7/2013 | Swist |

OTHER PUBLICATIONS

Wikipedia. "Google Maps." [Retrieved on Jul. 7, 2010] Retrieved from the Internet <URL: http://en.wikipedia.orj>/w/index.php?title= Goosle Maos&priritable=Yes> 17 pages.

COMPUTING DEVICES AND METHODS FOR IDENTIFYING GEOGRAPHIC AREAS THAT SATISFY A SET OF MULTIPLE DIFFERENT CRITERIA

CROSS-REFERENCE TO RELATED APPLICATIONS

This application is a continuation of U.S. patent application Ser. No. 13/785,622, filed Mar. 5, 2013, the entire disclosure of which is hereby expressly incorporated by reference herein.

FIELD OF THE INVENTION

The present disclosure relates to identification of geographic areas that satisfy multiple different criteria. More specifically, the present disclosure relates to a geographic area identification user interface that allows a user, or a collaborating group of users, to enter multiple different criteria and that identifies at least one geographic area that satisfies all of the multiple different criteria.

BACKGROUND

Geographic mapping applications represent some of the most frequently used computer-based applications. The underlying geographic maps often include various features, such as buildings, properties and landmarks in addition to roadways. After launching a mapping application, an interface is used to specify a desired view of an associated geographic map to be displayed within a map viewport.

Identifying geographic areas that satisfy multiple different criteria is desirable. In particular, it is desirable to provide a user interface that allows a user, or a collaborating group of users, to specify multiple different criteria, identify at least one geographic area of a geographic map to satisfy the multiple different criteria and to generate a geographic map display with the identified geographic areas visually differentiated.

SUMMARY

A method is provided for displaying a geographic map within a map viewport of a display of a computing device. The method includes presenting, on the display, a user interface having a criteria entry area and receiving criteria data that represents multiple different criteria. The method further includes transmitting the received criteria data via a network interface and receiving map data that represents a geographic map. The geographic map includes at least one identified two-dimensional area that includes a plurality of features that include multiple different characteristics which correspond to at least one of the multiple different criteria. The at least one identified two-dimensional area is bounded by a polygon that surrounds the plurality of features. The method also includes generating, using the received map data, a display of a geographic map having the at least one identified two-dimensional area visually differentiated from the remainder of the geographic map, based the features within the identified area that include the multiple different characteristics that correspond to the multiple different criteria.

In another embodiment, a computing device is provided which is configured for identifying a two-dimensional area within a geographic map that satisfies multiple different criteria. The computing device includes a criteria data retrieval module stored on a memory that, when executed on a processor, retrieves criteria data which represents multiple different criteria. The computing device further includes a map data retrieval module stored on a memory that, when executed on a processor, retrieves map data which represents a geographic map comprising a plurality of features, the features comprise multiple different characteristics. The at least one identified two-dimensional area is bounded by a polygon that surrounds the plurality of features. The computing device also includes an area identification module stored on a memory that, when executed on a processor, identifies, using the retrieved criteria data and the retrieved map data, at least one two-dimensional area within the geographic map that comprises features having characteristics that correspond to at least one of the multiple different criteria.

In a further embodiment, a non-transitory, computer-readable medium, is provided which includes instructions for identifying a two-dimensional area within a geographic map that satisfies multiple different criteria. The non-transitory, computer-readable medium includes a criteria data retrieval module that, when executed on a processor, retrieves criteria data which represents multiple different criteria. The non-transitory, computer-readable medium further includes a map data retrieval module that, when executed on a processor, retrieves map data which represents a geographic map comprising a plurality of features, the features comprise multiple different characteristics. The at least one identified two-dimensional area is bounded by a polygon that surrounds the plurality of features. The non-transitory, computer-readable medium also includes a two-dimensional area identification module that, when executed on a processor, identifies, using the retrieved criteria data and the retrieved map data, at least one two-dimensional area within the geographic map that comprises features having characteristics that correspond to at least one of the multiple different criteria.

The features and advantages described in this summary and the following detailed description are not all-inclusive. Many additional features and advantages will be apparent to one of ordinary skill in the art in view of the drawings, specification, and claims hereof.

DETAILED DESCRIPTION

Figure 1:
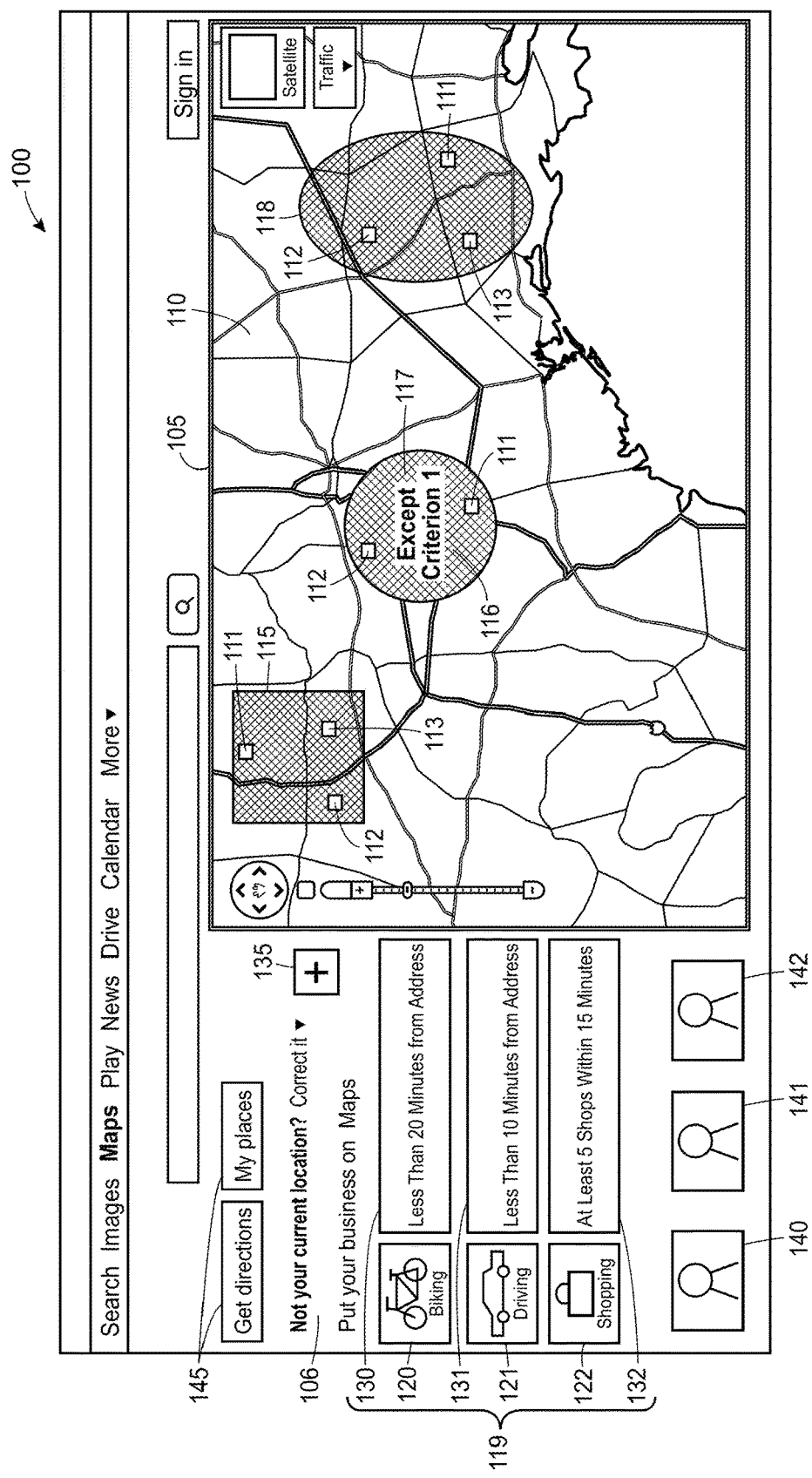
FIG. 1 depicts an example geographic area identification interface which includes a multiple different criteria entry section and identified areas that satisfy multiple different criteria.

Mapping applications currently allow a user to identify a point location within a geographic map (e.g., a single address, intersection, origin and destination, etc.). For example, a user can enter an address of a first location and an address for a second location to obtain directions from the first location to the second location. However, known mapping applications do not allow a user to identify an area or region of a geographic map based on multiple different criteria. The geographic area identification interface of the present disclosure may allow a user, or a collaborating group of users, to enter multiple different criteria. The geographic area identification interface may identify an area or areas of a geographic map based on the multiple different criteria and generate a display which depicts the geographic areas visually differentiated within an associated geographic map display.

For example, a user may wish to identify a location for her new pizza shop based on two different criteria: 1) the location of the pizza shop is within a 10 minute walk to the five largest shopping centers in the financial district of San Francisco and 2) the pizza shop location is within a 20 mile drive from her house. The geographic area identification interface of the present disclosure may allow the user to enter the multiple different criteria (e.g., the walk time to the five largest shopping centers and the drive time to her house). The geographic area identification interface may identify at least one geographic area that satisfies the multiple different criteria and generate a display which depicts the identified geographic area(s) visually differentiated within an associated geographic map display.

In another example, Adam, Bob, and Charlie are three recent college graduates who have decided to look for a house to live in together. Adam wants to drive no more than 30 minutes to work. Bob, who is an avid cyclist, insists on biking to work daily. Bob would prefer for his bike ride to work to take less than an hour, one-way. Charlie is still looking for a job and enjoys spending his time at coffee shops. Therefore, Charlie's only requirement for the location of their new house is that it is within a 20-minute drive from a coffee shop. The geographic area identification interface of the present disclosure may allow Adam, Bob and Charlie to enter the multiple different criteria (e.g., Adam's drive time to work, Bob's bike ride time to work and Charlie's drive time to a coffee shop). The geographic area identification interface may allow Adam, Bob and Charlie to use separate client devices at geographically separate locations to individually enter their respective criterion. The geographic area identification interface may identify at least one geographic area that satisfies the multiple different criteria and generate a display which depicts the identified geographic area(s) visually differentiated within an associated geographic map display.

The geographic area identification interface of the present disclosure may also allow a user to directly draw a boundary around a desired geographic area. Once the user identifies the geographic area, the geographic area identification interface of the present disclosure may allow use of standard mapping application features (e.g., around me, get directions, my places, etc.) to further explore the identified geographic area.

In any event, the geographic area identification interface of the present disclosure may identify at least one geographic area of a geographic map that satisfies multiple different criteria and generate a display of a geographic map including the geographic areas that satisfy the multiple different criteria. The geographic areas within the displayed geographic map which satisfy the multiple different criteria may be highlighted and/or outlined to visually differentiate the identified geographic areas. Once the geographic areas, which satisfy the multiple different criteria, are identified within a display, the identified geographic area(s) may be further explored using standard mapping application features (e.g., around me, get directions, my places, etc.), such as identification of points of interest within the area. In certain instances, multiple separate geographic areas may be identified and any given identified geographic area may be displayed along with an accompanying indication that some criteria were or were not satisfied.

FIG. 1 illustrates a display 100 which includes a geographic map 110 with identified geographic areas 115, 116, 118 visually differentiated within the geographic map 110. As described in detail herein, the geographic areas 115, 116, 118 are identified based on multiple different criteria data 119 that includes criteria data pairs that include a criteria type 120, 121, 122 and a criteria value 130, 131, 132 which are entered by a user, or a collaborating group of users, of a corresponding geographic area identification interface 100. As further depicted in FIG. 1, any given identified geographic area 116 may include an indication 117 that a certain criterion has, or certain criteria have, not been satisfied. The geographic map 110 includes various map features 111, 112, 113, such as buildings, landmarks, roadways, bike paths, sidewalks, shopping centers, restaurants, houses, apartments, coffee shops, corporations, etc.

With further reference to FIG. 1, the display 100 may include a criteria/collaborator entry section 106 proximate the map viewport 105 for entering multiple different criteria 120, 130, 121, 131, 122, 132 (collectively 119) and collaborator information 140, 141, 142. The geographic area identification interface of the present disclosure may include a multiple different criteria/collaborator entry section 106 within the display 100 that has two entries for each criterion. The first entry (e.g., criterion type 120, 121, 122 of FIG. 1) may represent a type of criterion, such as biking time, driving time, number of shopping centers, distance, walking time, etc. The second entry (e.g., criterion value 130, 131, 132 of FIG. 1) may represent a desired value associated with the given criterion type 120, 121, 122, such as less than ten minutes, less than twenty miles, more than ten shops, etc. and may depend on the criteria type 120, 121, 122. The criteria/collaborator entry section 106 may be presented to the user as an array of two columns (e.g., first column 120, 121, 122 and second column 130, 131, 132 of FIG. 1) and multiple rows (e.g., first row 120, 130, second row 121, 131 and third row 122, 132 of FIG. 1). Each row may represent a particular criterion, the first column may represent a criterion type 120, 121, 122, and the second column may represent a criterion type value 130, 131, 132. The criteria/collaborator entry section 106 may be configured such that the user may select a criterion add feature 135 to enter another row. The criteria/collaborator entry section 106 may include a plurality of sub-sections, with each sub-section being available to an individual user of a collaborating group of users 140, 141, 142.

The criteria/collaborator entry section 106 may include a criteria add feature 135 which may allow a user to add more criteria entries. The criteria/collaborator entry section 106 may also include collaborator entries 140, 141, 142 that allow a plurality of users to collaborate in entering multiple different criteria data 119. When a plurality of users collaborate, the multiple different criteria data 119 may be entered by the individual users with different client devices (e.g., client device 205 of FIG. 2) from different geographic locations.

The display 100 may include standard geographic mapping application features 145 which allow a user to explore the identified areas 115, 116, 118 and the geographic map 110. For example, a user may select one of the identified areas 115, 116, 118 and then use the standard geographic mapping application features 145 to explore only the selected one of the identified areas 115, 116, 118. Alternatively, a user may use the standard geographic mapping application features 145 to explore the geographic map 110.

Figure 2:
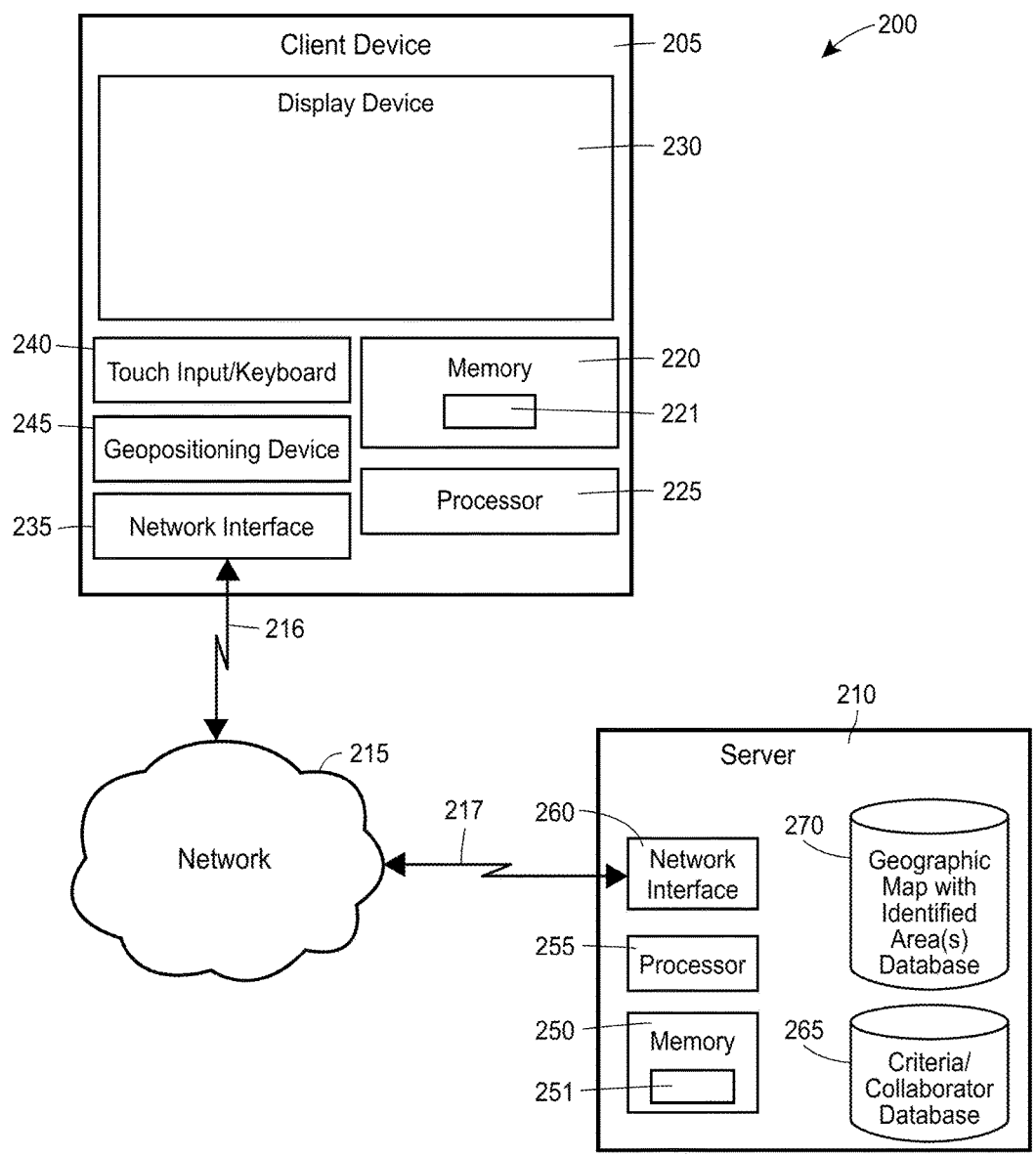
FIG. 2 depicts a high-level block diagram of an example of a computer system for implementing geographic area identification based on multiple different criteria.

The details associated with a geographic mapping system 200 for identification of geographic areas within a geographic map based on multiple different criteria are now described beginning with reference to FIG. 2. FIG. 2 depicts a high-level block diagram of a geographic mapping system 200 that implements communications between a client device 205 and a remote computing device 210 to provide information to a user of the client device 205. The client device 205 is communicatively coupled to the remote computing device 210 via a network 215.

For clarity, only one client device 205 is depicted in FIG. 2. While FIG. 2 depicts only one client device 205, it should be understood that any number of client devices 205 may be supported and that each client device 205 may be any appropriate computing device, such as a desk-top computer, a mobile telephone, a personal data assistant, a lap-top computer, a vehicle-based computer system, etc. The client device 205 may include a memory 220 and a processor 225 for storing and executing, respectively, a module 221. The module 221, stored in the memory 220 as a set of computer-readable instructions, may be related to a geographic area identification user interface 100 that, when executed on a processor 225, facilitates criteria data entry, collaboration data entry and geographic map with identified area display generation. The module 221 may also facilitate communications between the computing device 210 and the client device 205 via a network interface 235, a client device network connection 216 and the network 215, and other functions and instructions. The client device 205 may include a geopositioning device 245, such as a global positioning system receiver or a WiFi positioning device for determining a geographic location of the client device 205. The client device 205 may include a display device 230 which may be any type of electronic display device such as a liquid crystal display (LCD), a light emitting diode (LED) display, a plasma display, a cathode ray tube (CRT) display, or any other type of known or suitable electronic display. The display device 230 may exhibit a display 100 which depicts identified geographic areas 115, 116, 118 within a geographic map 110 at a particular zoom level based on criteria data 119 entered by a user of the client device 205. The client device 205 may include a user input device 240, such as a touch input/keyboard that provides a mechanism for a user of the client device 210 to enter various information, such as multiple different criteria data 119 or criteria data 315 of FIG. 3, and/or collaboration data 320. The user input device 240 may be configured as an integral part of a display device 230, such as a touch screen display device. The network interface 235 may be configured to facilitate communications between the client device 205 and the remote computing device 210 via any hardwired or wireless communication network 215, including for example a hardwired Ethernet connection or a wireless LAN, MAN or WAN, WiFi, the Internet, or any combination thereof. Moreover, the client device 205 may be communicatively connected to the remote computing device 210 via any suitable communication system, such as via any publicly available or privately owned communication network, including those that use wireless communication structures, such as wireless communication networks, including for example, wireless LANs and WANs, satellite and cellular phone communication systems, etc.

The computing device 210 may include a memory 250 and a processor 255 for storing and executing, respectively, a module 251. The module 251, stored in the memory 250 as a set of computer-readable instructions, facilitates applications related to identification of geographic areas, within a geographic map, based on multiple different criteria. The module 251 may also facilitate communications between the computing device 210 and the client device 205 via a network interface 260, a remote computing device network connection 217 and the network 215 and other functions and instructions.

The computing device 210 may also include a criteria/collaborator database 265 having data representative of multiple different criteria and collaboration data that are entered by a user, or a collaborating group of users of a corresponding mapping application. The computing device 210 may further include a geographic map with an identified area(s) database 270 having data representative of a geographic map, such as continents, countries, states, counties, cities, roadways, etc. and various features which are included in the geographic map, such as buildings, landmarks, natural features, etc. While the criteria/collaborator database 265 and the geographic map with identified area(s) database 270 are shown in FIG. 2 as being contained within the remote computing device 210, it should be understood that the criteria/collaborator database 265 and the geographic map with identified area(s) database 270 may be located within separate remote servers (or any other suitable computing devices) communicatively coupled to the network 215. Optionally, portions of the criteria/collaborator database 265 and the geographic map with identified area(s) database 270 may be stored in memories separate from one another, such as a memory 220 of the client device 205.

Figure 3:
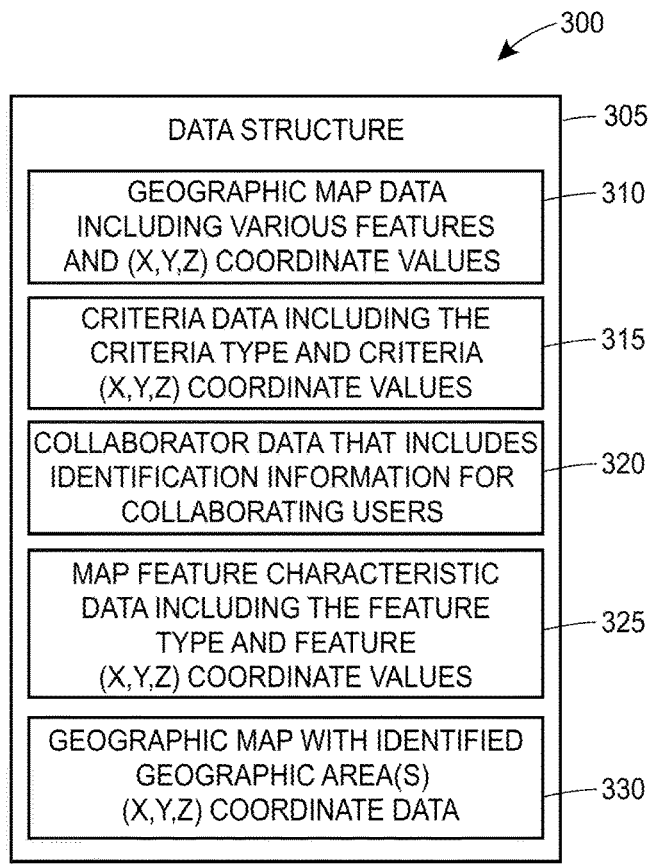
FIG. 3 depicts an example data structure related to generating a display of a geographic map having identified geographic areas based on multiple different criteria.

Turning now to FIG. 3, a block diagram 300 of a data structure 305 is depicted. At least portions of the data structure 305 may be retrieved or transmitted when the processor 225 executes any one of the modules 435, 440 or when the processor 255 executes any one of the modules 555, 560, 575. The data structure 305 may include geographic map data 310 representative of a geographic map 110. The geographic map data 310 may include various features and (x, y, z) coordinate values that define relative locations, municipalities, counties, states, continents, roadways, bike paths, sidewalks, oceans, lakes, rivers, waterways, etc. The (x, y, z) coordinate values of the geographic map data 310 may be used by the processor 225 to determine distances and times between different locations and map features.

The data structure 305 may also include criteria data 315 representative of multiple different criteria 119. The criteria data 315 may include data representative of the criteria type 120, 121, 122 and criteria type values 130, 131, 132.

The data structure 305 may further include collaborator data 320 representative of a collaborating group of users 140, 141, 142. The collaborator data 320 may identify any one of a collaborating group of users 140, 141, 142 and may associate individual criteria data (e.g., multiple different criteria 120, 130, 121, 131, 122, 132 of FIG. 1) with a group of collaborating users.

The data structure 305 may also include map feature characteristic data 325 that is representative of characteristics of various map features within a geographic map 110, such as buildings, landmarks, monuments, apartments, houses, pizza shops, shopping centers, restaurants, coffee shops, etc. The map feature characteristic data 325 may define map feature types and map feature (x, y, z) coordinate locations.

The data structure 305 may further include geographic map with identified geographic area (x, y, z) coordinate data 330. The geographic map with identified geographic area (x, y, z) coordinate data 330 may define a geographic map 110 and identified areas 115, 116, 118 that satisfy multiple different criteria 119. The geographic map with identified geographic area (x, y, z) coordinate data 330 may also define various map features, such as buildings, landmarks, monuments, apartments, houses, pizza shops, shopping centers, restaurants, coffee shops, etc., as well as information related to distances and times between the features. The geographic map with identified geographic area (x, y, z) coordinate data 330 may further define relative locations of map features, municipalities, counties, states, continents, roadways, bike paths, sidewalks, waterways, etc.

Figure 4:
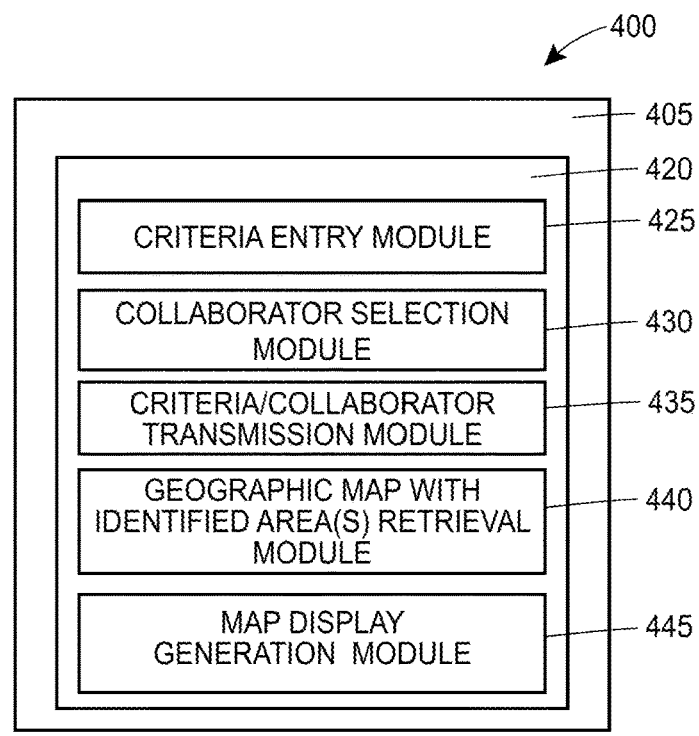
FIG. 4 depicts a block diagram of an example client device including various modules for implementing multiple different criteria entry, collaboration entry and geographic map with identified area display generation.

Turning now to FIG. 4, a block diagram 400 of a client device 405 is depicted. As described in detail herein, the client device 405 may be suitable for use as a client device 205 of FIG. 2. The client device 405 may include various modules 425, 430, 435, 440, 445 stored as tangible computer-executable instructions on a memory 420. A processor, similar to the processors 225, 255 may execute the instructions of the modules 425, 430, 435, 440, 445 to facilitate multiple different criteria data 119 entry, collaboration data entry and geographic map with identified area display generation. Particularly, when a user of a geographic area identification interface # wishes to identify at least one geographic area 115, 116, 118, the processor 225 executes at least a portion of the instructions of the modules 425, 430, 435, 440, 445.

While the modules 425, 430, 435, 440, 445 may be stored on the memory 220 and implemented as a portion of the module 221, it should be understood that the modules 425, 430, 435, 440, 445, or a portion thereof, may be stored on the memory 250 and implemented as at least a portion of the module 251. While modules 425, 430, 435, 440, 445 may be executed by either processor 225 or 255, the modules 425, 430, 435, 440, 445 will be described herein as being executed by processor 225.

In any event, the processor 225 may execute a criteria entry module 425 that allows a user, or collaborating users to enter multiple different criteria 119. The processor 225 may execute a collaborator selection module 430 that allows collaborating users 140, 141, 142 to identify themselves and associate the identified users as a collaborating group of users 140, 141, 142. The processor 225 may execute a criteria/collaborator transmission module 435 that transmits criteria data 315 and collaborator data 320 to a criteria/collaborator database 265. As described herein, a remote computing device 510 may use the criteria data 315 to identify at least one geographic area 115, 116, 118 that satisfies multiple different criteria 119.

The processor 225 may execute a geographic map with identified area(s) retrieval module 440 that retrieves geographic map with identified area(s) data 330 from a geographic map with identified area(s) database 270. The processor 225 may execute a map display generation module 445 that generates, using the geographic map with identified area(s) data 330, a display 100 of a geographic map 110 that includes identified geographic areas 115, 116, 118 within a map viewport 105.

Alternatively, the processor 225 may execute a geographic map data retrieval module 221 to retrieve map data 310, execute the display generation module 445, and generate a display 100 based on the retrieved map data 310. The processor 225 may then identify at least one geographic area 115, 116, 118 based on identifying an area on the displayed geographic map. In some embodiments, a user may identify an area on the map using a user input mechanism (e.g., touch input/keyboard 240 of FIG. 2) around the area 115, 116, 118 within a geographic map 110.

Figure 5:
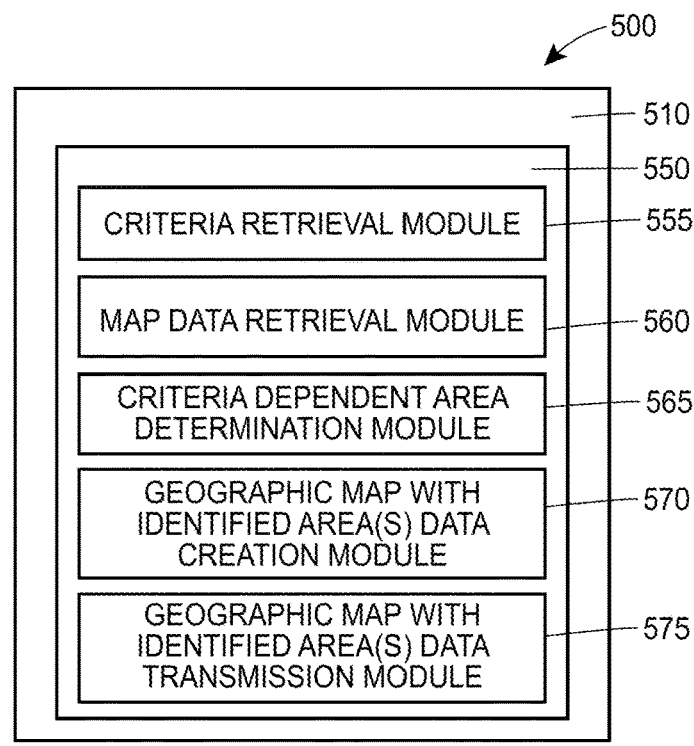
FIG. 5 depicts a block diagram of an example computer device for implementing geographic area identification based on multiple different criteria.

Turning now to FIG. 5, a block diagram 500 of a computing device 510 is depicted. As described in detail herein, the computing device 510 may be a server for a mapping system that is suitable for use as a remote computing device 210 of FIG. 2. The computing device 510 may include various modules 555, 560, 565, 570, 575 stored on a memory 550. A processor, similar to the processors 225, 255 may execute the modules 555, 560, 565, 570, 575 to identify at least one geographic area 115, 116 or 118 within a geographic map 110 that satisfies multiple different criteria 119. In particular, when a geographic area identification interface (e.g., as shown in display 100 of FIG. 1) receives criteria data 119 to identify areas 115, 116, 118 of a geographic map 110, the processor 255 executes at least a portion of the instructions of the modules 555, 560, 565, 570, 575.

While the modules 555, 560, 565, 570, 575 may be stored on the memory 250 and implemented as a portion of the module 251, it should be understood that the modules 555, 560, 565, 570, 575, or a portion thereof, may be stored on the memory 220 and implemented as at least a portion of the module 221. While modules 555, 560, 565, 570, 575 may be executed by either processor 225 or 255, the modules 555, 560, 565, 570, 575 will be described herein as being executed by processor 255.

In any event, the processor 255 may execute a criteria retrieval module 555 that retrieves criteria data 315 from a criteria/collaborator database 265. The criteria data may include data representative of multiple different criteria 119. The processor 255 may execute a map data retrieval module 560 that retrieves map data 310 from a geographic map database 270.

With further reference to FIG. 5, the processor 255 may execute a criteria dependent area determination module 565 that identifies at least one geographic area 115, 116 or 118 of a geographic map 110 that satisfies multiple different criteria 119 based on criteria data 315, map data 310 and map feature data 325. In particular, the processor 225 may compare multiple different criteria 119, that are represented by the criteria data 315, with corresponding map feature characteristics that are represented by the map data 310 and the map feature data 325 and identify at least one geographic area 115, 116, 118 that satisfies the multiple different criteria 119.

For example (e.g., EXAMPLE 1 from above), a first criterion type (e.g., criterion type 120 of FIG. 1) may be a walk time to the five largest shopping centers in the financial district of San Francisco and a corresponding first criterion type value (e.g., criterion type value 130 of FIG. 1) may be less than ten minute walk. A second criterion type (e.g., criterion type 121 of FIG. 1) may be a driving distance from a house and a corresponding second criterion type value (e.g., criterion type value 131 of FIG. 1) may be less than twenty mile drive. The processor 255 may use the retrieved map data 310 to determine which of the potential matching features 111, 112, 113 satisfy the criteria type values 130, 131. The processor 255 may then compare the first and second criteria types 120, 121 to various map feature 111, 112, 113 characteristics that are defined by the retrieved map feature characteristic data 325 to identify matching features that have previously been determined to satisfy the criteria type values 130, 131. The processor 255 may then determine at least one geographic area 115, 116, 118 based on the location of the map features that satisfy the multiple different criteria (e.g., multiple different criteria 120, 130, 121, 131 of FIG. 1). For example, the process 255 may determine a circle around each identified map feature 111, 112, 113 that matches a respective criteria type 120, 121, where a radius of each circle corresponds to the associated criteria type value 130, 131. The processor 255 may then identify a geographic area 115, 116, 117 based on overlapping portions of the determined circles. In particular, the processor 255 may determine a first circle around the house, where the first circle has a radius corresponding to a twenty mile driving distance from the house. The processor 255 may determine four additional circles around each of the four shopping centers, where each of the four circles has a respective radius corresponding to a ten minute walk. The processor 255 may then identify a geographic area 115, 116, 117 based on any overlapping area(s) of the five circles.

Alternatively, the processor 255 may execute the criteria dependent area determination module 565 that identifies at least one geographic area 116 of a geographic map 110 that satisfies at least some of the multiple different criteria (e.g., multiple different criteria 120, 130, 121, 131, 122, 132 of FIG. 1). In the event that the processor 255 determines that only some of the multiple different criteria 120, 130, 121, 131, 122, 132 are satisfied, the at least one geographic area 116 may include an indication 117 that signifies which criteria are not satisfied within the area 116.

With further reference to FIG. 5, the processor 255 may execute a geographic map with identified area(s) data creation module 570 to create data (e.g., geographic map with identified geographic area (x, y, z) coordinate data 330 of FIG. 3) based on criteria data 315, map data 310 and map feature data 325. The processor 255 may execute a geographic map with identified area(s) data transmission module 575 to transmit the geographic map with identified area(s) data 330 to a map database 270.

Figure 6:
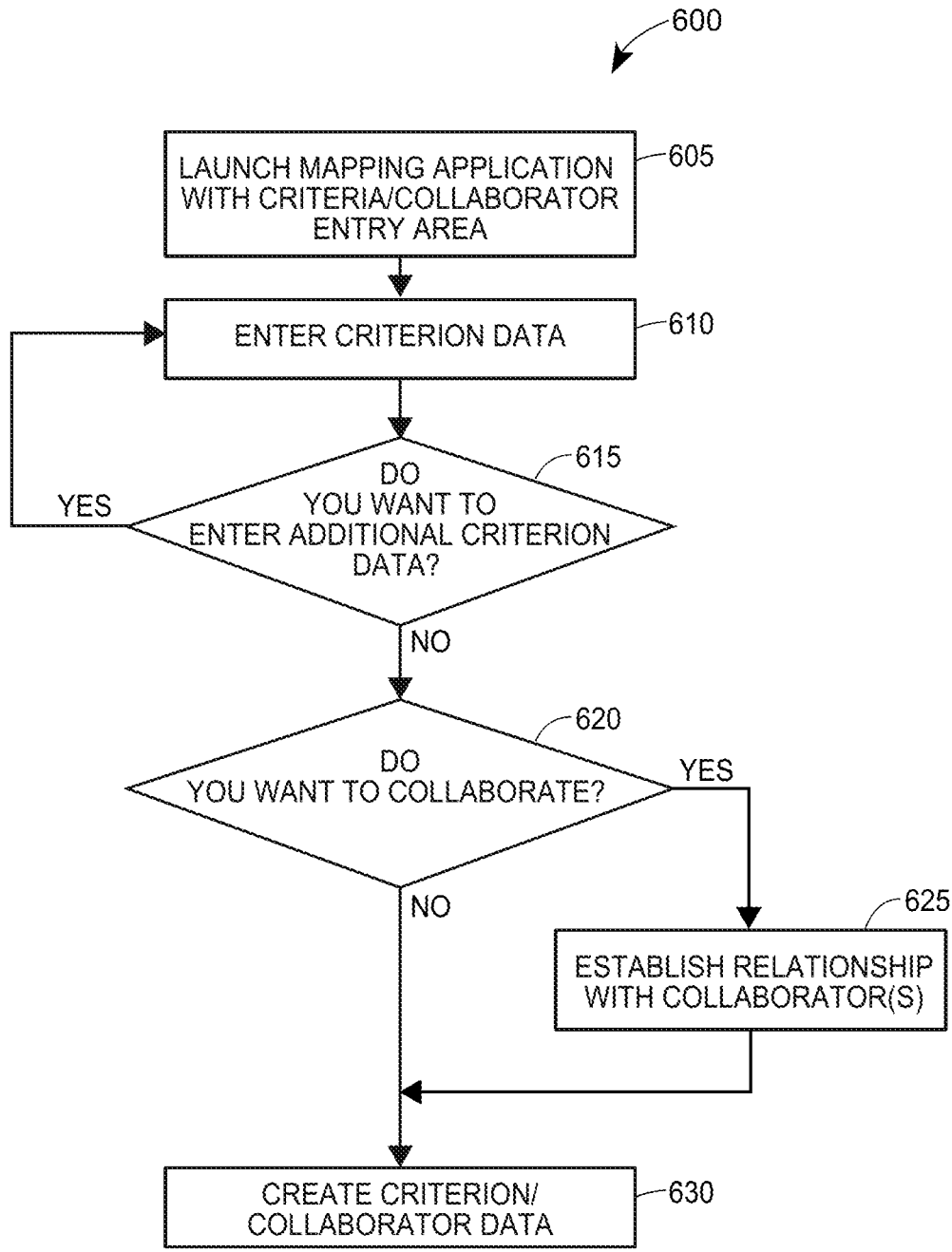
FIG. 6 depicts an example of a flow diagram for a method for multiple different criteria entry, collaboration entry and geographic map with identified area display generation.

With reference now to FIG. 6, a flow diagram depicts a method 600 of entering multiple criteria data 119 and collaborating user data 140, 141, 142. The method 600 may be implemented within any suitable computing device, such as either of the client devices 205, 405 of FIG. 2 and FIG. 4, respectively, or either of the computing devices 210, 510 of FIG. 2 and FIG. 5, respectively. It should be understood that the modules 425, 430, 435 of FIG. 4 or the module 555 of FIG. 5 may be executed by a processor, similar to processors 225, 255 of FIG. 2, to implement the method 600. While the modules 425, 430, 435 may be executed by either processor 225 or 255 to implement the method 600, execution by the processor 225 will be described herein.

The processor 225 may launch a map area identification interface (e.g., shown within display 100 of FIG. 1) with criteria/collaborator entry section 106 (block 605) to allow a user to enter multiple different criteria data 119 and collaborating user data 140, 141, 142. A user may enter multiple different criteria data 119 and collaborator data 140, 141, 142 (block 610). The processor 225 may determine whether a user wishes to enter additional criterion data (block 615). If the processor 225 determines that the user wishes to enter additional criteria data (block 615), the method 600 returns to block 610. If the processor 225 determines that the user does not wish to enter additional criteria data (block 615), the method proceeds to block 620.

The processor 225 may determine whether the user wants to collaborate with other users (block 620) based on the collaborator data 140, 141, 142. If the processor 225 determines that the user wants to collaborate (block 620), the method 600 proceeds to block 625. The processor 225 may establish a relationship with collaborating users (block 625) in response to a user entering collaborating user data 140, 141, 142.

With further reference to FIG. 6, if the processor 225 determines that the user does not want to collaborate (block 620) or once the processor 225 establishes a relationship with collaborating users (block 625), the method proceeds to block 630. The processor 225 may create criteria data 315 and collaborator data 320 (block 630) based on the user entered multiple different criteria data 119 and based on the user entered collaborating user data 140, 141, 142, respectively.

Figure 7:
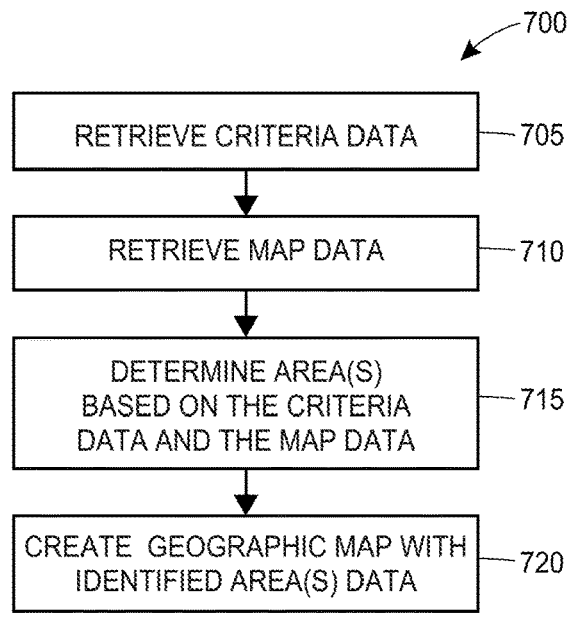
FIG. 7 depicts an example of a flow diagram for a method for geographic area identification within a geographic map based on multiple different criteria.

Turning now to FIG. 7, a flow diagram depicts a method 700 of determining at least one geographic area 115, 116, 118 within a geographic map 110 which satisfies multiple different criteria 119. The method 700 may be implemented within any suitable computing device, such as either of the client devices 205, 405 of FIG. 2 and FIG. 4, respectively, or either of the computing devices 210, 510 of FIG. 2 and FIG. 5, respectively. It should be understood that the module 440 of FIG. 4 or the modules 555, 560, 565 of FIG. 5 may be executed by a processor, similar to processors 225, 255 of FIG. 2, to implement the method 700. While the modules 440, 555, 560, 565 may be executed by either processor 225, 255 to implement the method 700, execution by the processor 255 will be described herein.

In any event, the processor 255 may retrieve criteria data 315 (block 705) from a criteria database 265. The processor 255 may retrieve map data 310 (block 710) from a map database 270.

With further reference to FIG. 7, the processor 255 may determine at least one geographic area 115, 116, 118 of a geographic map 110 that satisfies multiple different criteria 119 based on criteria data 315, geographic map data 310 and map feature characteristic data 325 (block 716). In particular, the processor 255 may compare the multiple different criteria 119, which are represented by the criteria data 315, to corresponding characteristics of various map features which are represented by the geographic map data 310 and the map feature characteristic data 325. The processor 255 may create geographic map with identified area(s) data 330 (block 720).

For example (e.g., EXAMPLE 2 from above), a first criterion type (e.g., criterion type 120 of FIG. 1) may be a drive type to work and a corresponding first criterion type value (e.g., criterion type value 130 of FIG. 1) may be less than thirty minutes. A second criterion type (e.g., criterion type 121 of FIG. 1) may be a bike ride time to work and a corresponding second criterion type value (e.g., criterion type value 131 of FIG. 1) may be less than one hour. A third criterion type (e.g., criterion type 122 of FIG. 1) may be a drive time to a Starbucks and a corresponding second criterion type value (e.g., criterion type value 132 of FIG. 1) may be less than twenty minutes. The processor 255 may compare the first, second and third criteria types 120, 121, 122 to various map feature 111, 112, 113 characteristics that are defined by the retrieved map feature characteristic data 325 to identify potential matching features. The processor 255 may then use the retrieved map data 310 to determine which of the potential matching features also satisfy the criteria type values 130, 131, 132. The processor 255 may then determine at least one geographic area 115, 116, 118 based on the location of the map features that satisfy the multiple different criteria 119 (block 715).

Alternatively, the processor 255 may identify at least one geographic area 116 of a geographic map 110 that satisfies at least some of the multiple different criteria 119 (block. In the event that the processor 255 determines that only some of the multiple different criteria 119 are satisfied, the at least one geographic area 116 may include an indication 117 that signifies which criteria are not satisfied within the area 116.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system and a method for identifying areas within a geographic map that satisfy multiple different criteria for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for identifying areas within a geographic map that satisfy multiple different criteria. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating displays of geographic areas satisfying multiple criteria, the method implemented on one or more processors and comprising:
   presenting, on respective displays of a plurality of client devices, a user interface having a criteria entry area, each of the plurality of client devices operated by a different user;
   receiving criteria data that represents multiple different independent criteria, each of the multiple different independent criteria received from a different one of the plurality of client devices and corresponding to respective at least one potentially matching feature;
   transmitting the received criteria data via a network interface; and
   receiving map data at the plurality of client devices, wherein the map data represents a geographic map having at least one identified two-dimensional area that includes a plurality of features that satisfy the multiple different independent criteria and wherein the at least one identified two-dimensional area is bounded by a polygon or oval that surrounds the plurality of features.

2. The method of claim 1, further comprising:
   presenting the criterion entry area, of the user interface, proximate to the map viewport.

3. The method of claim 1, wherein each of the multiple different criteria includes a criterion type and a criterion value.

4. The method of claim 3, wherein the criterion type includes distance, walking time, biking time, driving time and available shopping.

5. The method of claim 3, wherein the criterion value includes less than a number of miles, less than a number of minutes and more than a given number within a given distance.

6. The method of claim 1, further comprising:
   generating, using the received map data, a display of a geographic map having the at least one identified two-dimensional area visually differentiated from the remainder of the geographic map, based on the plurality features.

7. The method of claim 6, wherein the display includes multiple identified two-dimensional areas and wherein at least one of the multiple identified two-dimensional areas is accompanied by an indication that at least one of the multiple different criteria was not satisfied.

8. The method of claim 6, wherein generating the display of the geographic map includes generating the display include a plurality of non-overlapping regions visually differentiated from the remainder of the geographic map, each including one or more features that include the multiple different characteristics.

9. The method of claim 1, wherein the identified two-dimensional area corresponds to an overlapping portion of a plurality of circles, each circle corresponding to a respective one of the plurality of features.

10. The method of claim 9, wherein at least two of the plurality of circles have different radii.

11. The method of claim 1, wherein the plurality of client devices are disposed at geographically separate locations.

12. The method of claim 1, receiving the criteria data includes receiving, from one of the plurality of client devices, a boundary around a desired geographic area drawn by the corresponding user.

13. A method in a server, the method comprising:
receiving, by one or more processors, criteria data from a plurality of client devices via a communication network, each of the plurality of client devices operated by a different user, wherein the criteria data represents multiple different independent criteria;
identifying, by one or more processors, a plurality of features that match the multiple different independent criteria, wherein for each of the multiple different independent criteria, a respective at least one matching feature is identifiable based only on the criterion; and
determining, by one or more processors, at least one two-dimensional area bounded by a polygon or oval and surrounding the plurality of features;
providing, to the at least one client device, map data for the two-dimensional area.

14. The method of claim 13, wherein identifying the at least one two-dimensional area includes identifying a first two-dimensional area including a first subset of the plurality of features and a second two-dimensional area including a second subset of the plurality of features, wherein the first two-dimensional area and the second two-dimensional area are non-overlapping.

15. The method of claim 13, wherein determining, by one or more processors, at least one two-dimensional area includes:
determining a respective circle around each of the identified features, and
determining the at least one two-dimensional area based on overlapping portions of the determined circles.

16. The method of claim 15, wherein at least of the circles have different radii.

17. The method of claim 13, wherein the plurality of client devices are disposed at geographically separate locations.

18. The method of claim 13, wherein the criteria data includes an indication of at least one of (i) distance, (ii) walking time, (iii) biking time, (iv) driving time and (v) available shopping.

19. The method of claim 13, wherein the criteria data includes a boundary around a desired geographic area drawn by the corresponding user.

20. The method of claim 13, wherein the map data corresponds to a geographic map in which the two-dimensional area is visually differentiated from the remainder of the geographic map.

* * * * *